Jan. 30, 1951 D. E. SUNSTEIN 2,540,016
ELECTRICAL SYSTEM
Filed March 17, 1948 6 Sheets-Sheet 2
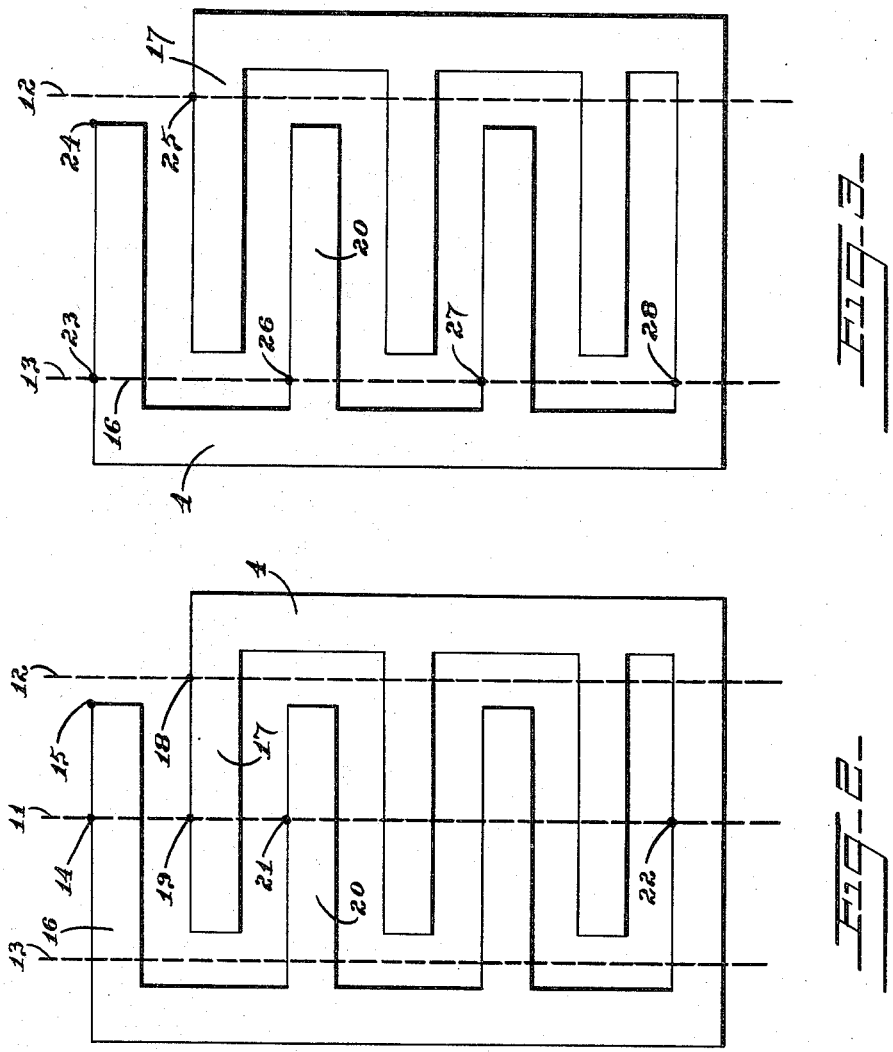
INVENTOR.
DAVID E. SUNSTEIN
BY Ostrolenk & Faber
ATTORNEYS Jan. 30, 1951 D. E. SUNSTEIN 2,540,016
ELECTRICAL SYSTEM
Filed March 17, 1948 6 Sheets-Sheet 3

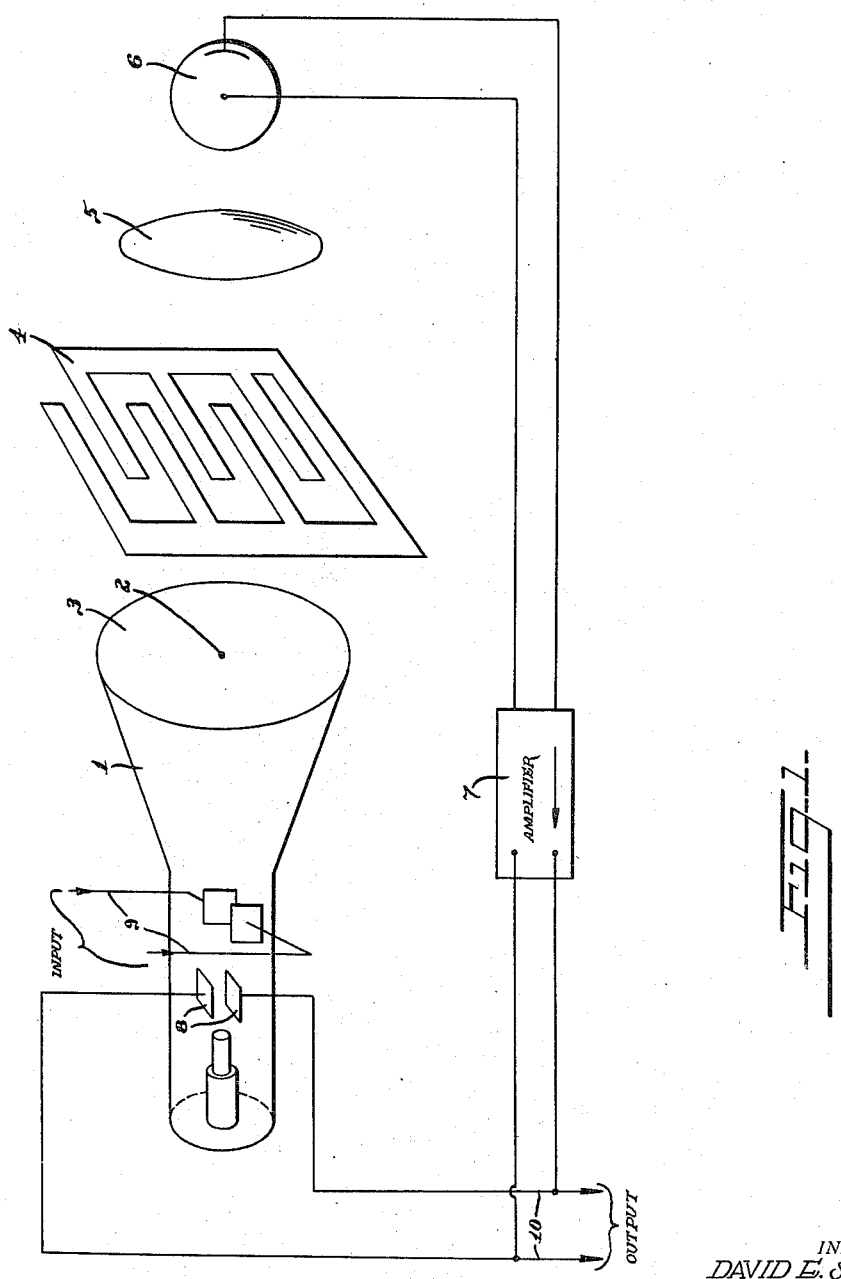

INVENTOR.
DAVID E. SUNSTEIN

BY Ostrolenk & Faber
ATTORNEYS

Jan. 30, 1951　　　　　D. E. SUNSTEIN　　　　　2,540,016
ELECTRICAL SYSTEM

Filed March 17, 1948　　　　　　　　　　　　　6 Sheets-Sheet 4

INVENTOR.
DAVID E. SUNSTEIN

BY Ostrolenk & Faber
ATTORNEYS

Jan. 30, 1951  D. E. SUNSTEIN  2,540,016
ELECTRICAL SYSTEM

Filed March 17, 1948  6 Sheets-Sheet 5

INVENTOR.
DAVID E. SUNSTEIN

BY Ostrolenk + Faber
ATTORNEYS

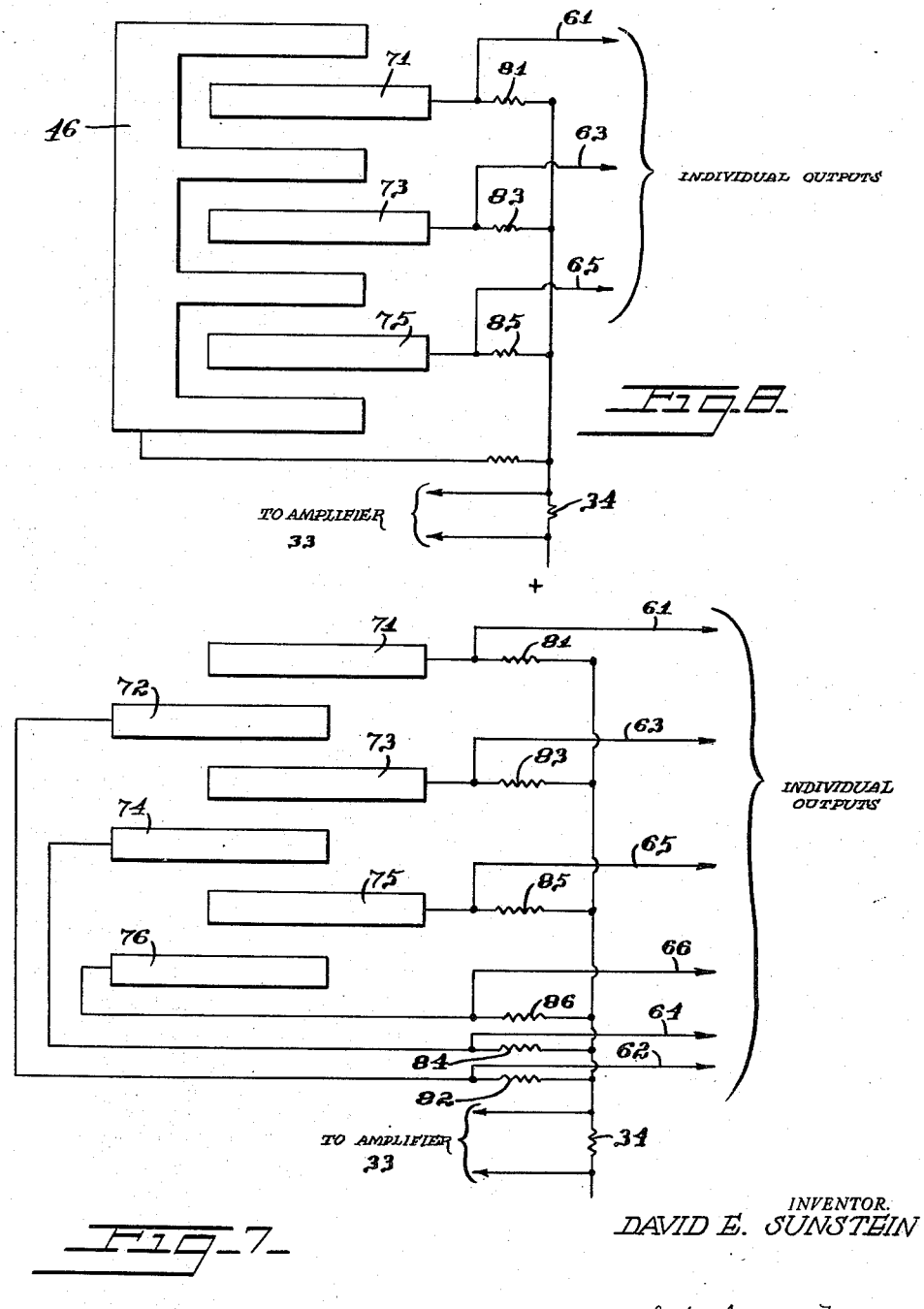

Patented Jan. 30, 1951

2,540,016

UNITED STATES PATENT OFFICE 2,540,016

ELECTRICAL SYSTEM

David E. Sunstein, Cynwyd, Pa., assignor to Philco Corporation, a corporation of Pennsylvania Application March 17, 1948, Serial No. 15,482

4 Claims. (Cl. 315—21)

This invention which is a continuation of my application Serial No. 606,773, filed July 24, 1945, and issued October 31, 1950, as Patent 2,528,020, relates to counter circuits of the electronic type.

More specifically it relates to circuits for producing electrical output signals such that each output signal represents a certain integral number of electrical input pulse signals.

One object of my invention is to enable the electron beam in an electron discharge device to be transferred in a prescribed manner from one position to another or to a series of positions in a prescribed sequence.

Another object of my invention is to provide a device which will generate an output voltage proportional to the number of input pulses to the device.

Still another object of my invention is to provide a device which will generate a cyclical or repetitious voltage with a period of repetition which is an integral number of input pulses, regardless of any irregularity in the timing of the input pulses.

Another object of my invention is to provide a plurality of output circuits which are energized sequentially in such a manner that each successive input pulse causes the energized output circuit to be advanced one step in the sequence of output circuits.

Such devices are useful in many forms of electrical counting circuits and may be applied to any of the uses to which such counting circuits may be applied. In addition to counting, these uses include the generation of the sweeping and synchronizing signals in television systems, the detection of frequency modulated signals and other uses.

In accordance with one embodiment of my invention, a cathode ray tube is arranged in association with a mask, a photoelectric cell and a feedback circuit so that the spot of light on the face of the cathode ray tube marking the end of the electron beam within the tube is in line with the photoelectric cell and the upper edge of the mask. The feedback circuit receives a signal from the photoelectric cell and in consequence of this signal causes a deflecting voltage to be applied to the beam deflection system of the cathode ray tube. In consequence of this, the spot is locked in position at one edge of the mask. This locking action has been fully detailed in my patent application Serial No. 606,773 filed July 24, 1945.

My present invention uses a mask made in the form of a multiplicity of projections, alternately connected to a base section on opposite sides of the mask area. Through appropriate action of the system an input pulse causes the spot to be shifted from one projection to the next. When the spot has progressed to the last of the group of projections, means are provided to return the spot to the first of the group of projections and the action is repeated.

The output voltage from the system is taken as the voltage across the deflecting system of the catode ray tube. Since this is proportional to the spot displacement, it changes progressively in one polarity as the spot progresses from projection to projection, but experiences a large change in the opposite polarity when the spot returns to the first projection from the last one. Thus the output voltage is cyclical with respect to a number of input pulses, which number is controlled by the number of projections on the mask.

Another form of my invention makes use of an arrangement whereby the mask is placed within the cathode ray tube and is caused to act as a target for the electron beam in such a manner that the beam just grazes one edge of this target and is locked there by a feedback system. The progression of the beam from projection to projection follows the pattern outlined above and the output is of the same character described above.

Means are provided for the return of the beam from the bottom of the target to the top after the beam reaches the bottom; but this may be made unnecessary by a polar target system in which the beam rotates from one radial projection to another.

Another modification of my invention incorporates individual output circuits from individual projections of the target, so that my invention may also be used as a cyclical switching device.

These and other purposes of my invention will become clear upon consideration of the drawings in which Figure 1 shows one basic form of counter.

Figure 2 shows a view of the mask of the counter in Figure 1 and its operation under combinations of positive and negative pulses.

Figure 3 shows the mask of Figure 1 and its operation under unidirectional pulses.

Figure 7 shows the target arranged to secure individual outputs from each tooth of the target when the input pulses are of alternate polarity.

Figure 8 shows the target arranged to secure individual pulses when the input pulses are all of one polarity.

Figure 4:
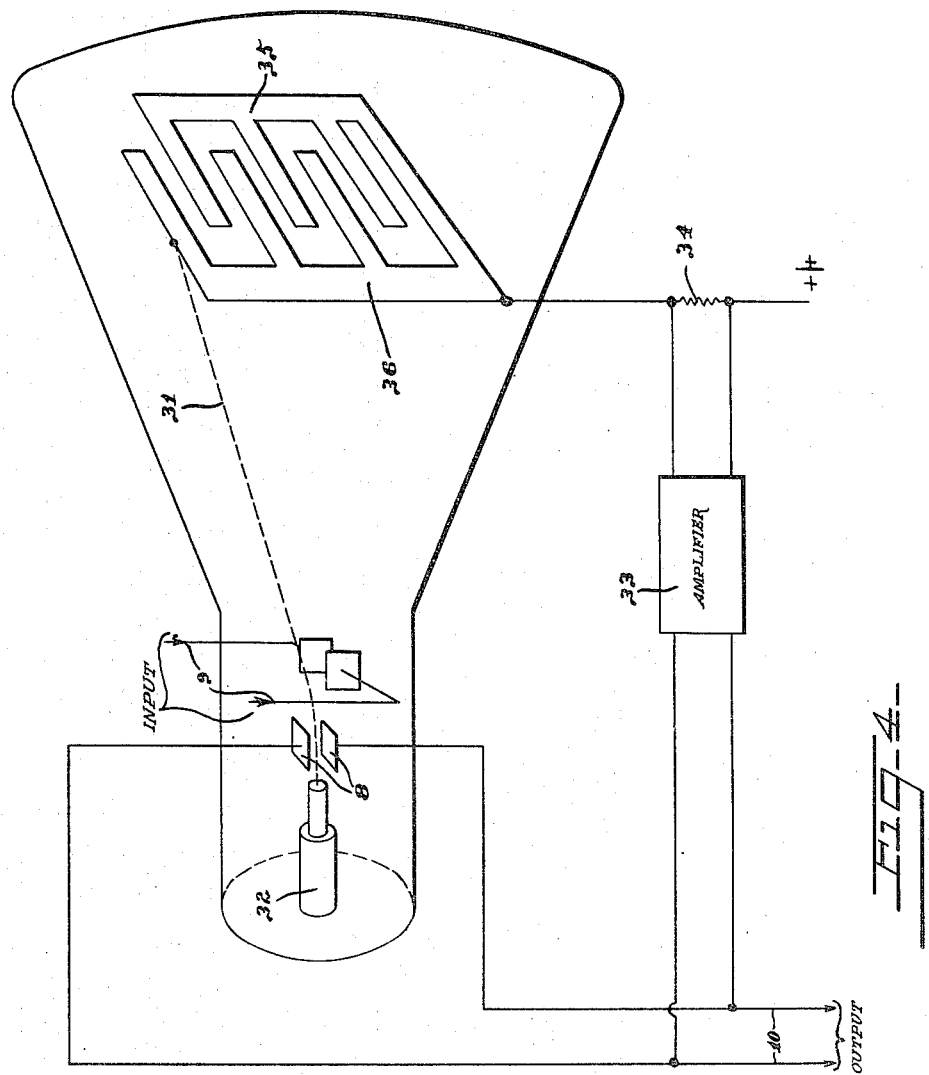
Figure 4 shows a means whereby the mask can be incorporated within the cathode ray tube.

Referring to Figure 1, a cathode ray tube 1 is arranged with an input circuit 9 and an output circuit 10 so that the voltage applied to the input circuit will cause deflection of the spot 2 on the face 3 of the tube 1 in a horizontal direction and so that the voltage at the output terminals will cause the spot 2 to deflect in the vertical direction on the face 3 of the cathode ray tube 1.

If the spot 2 is so located that light from it collected by lens 5 impinges upon photoelectric cell 6, then an input signal is applied to amplifier 7. As a result, amplifier 7 produces an output voltage which is impressed upon the vertical deflecting plates 8 as well as upon the output of the system. This voltage impressed upon the deflecting plates 8 is of such polarity as to cause spot 2 to move downwards across the face 3 of the cathode ray tube 1.

If the spot 2 is in such a location that mask 4 hides it from the photo cell 6, so that no signal is applied to the amplifier 7 by the photoelectric cell 6, then the amplifier 7 impresses an output voltage upon deflecting plates 8 such that the spot 2 on the cathode ray tube is caused to rise on the face of the tube.

This combination of actions will cause the spot 2 to rest in such a position that it is on an upper edge of mask 4 as is more completely described in my patent application Serial No. 606,773 filed July 24, 1945.

The action of this embodiment of my invention is particularly associated with the shape of mask 4 which has been detailed in Figure 2. Inasmuch as the spot on the cathode ray tube is automatically located on some upper edge of this mask, the action of the device is based upon an analysis following this principle of the spot always tending to arrive at an upper edge of the mask.

The input applied to connection 9 is such that with no input signal, the spot is somewhere on the dotted vertical line 11. If now a positive pulse is applied to this input, let us presume that the spot will be deflected to the right to some position on the vertical line 12, and that if a negative pulse is applied to the input, this spot will be deflected horizontally to some position on the vertical dotted line 13. Then presume that the spot 2 is so located as to be at position 14 with respect to the mask 4. If then a positive pulse is applied to the input, the spot on the cathode ray tube will move towards the right from position 14 until it reaches position 15 at the end of the uppermost tooth 16 in the mask 4.

When the spot reaches this position, it is no longer held at this vertical position by tooth 16 but the action of the photoelectric cell and amplifier cause the spot to fall to the top of the second tooth 17. Thus the spot comes to reside at position 18 when the pulse is at full amplitude. Then when the pulse is reduced to zero, the spot proceeds along the top of tooth 17 to position 19 which is one tooth lower on the mask than was the starting position 14.

A subsequent positive pulse will cause the spot to move out to position 18 and back to position 19 so that no change in the vertical position will occur and consequently no change in the output voltage will occur. The output voltage was thus reduced in value from the value corresponding to spot position 14 to the value corresponding to spot position 19 as a result of the first positive pulse applied to the input circuit but subsequent positive pulses had no effect.

When the spot is in position 19, a negative pulse will cause the spot to move to the left-hand edge of the tooth 17 and to then fall towards the third tooth 20, finally coming to rest at position 21 after the negative pulse is over. Corresponding to this, the output voltage has been changed in another step to the value required to hold the spot at the horizontal level of position 21. In this manner successive positive and negative pulses will cause the spot to drop successively from tooth to tooth until position 22 is reached.

Consequently in Figure 2 it has required alternate positive and negative pulses to cause the spot to make one full sweep from the top position 14 to the bottom position 22. This is essentially a type of counter circuit in which six pulses have given one complete sweep of the output voltage. The number of pulses is determined by the number of teeth and by adjusting the number of teeth any division factor may be obtained; for example, if instead of three teeth on each side of the mask, five teeth are used, the ratio becomes ten to one instead of six to one so that a decade counter can be made in this manner.

If it is desired to count pulses which are all of the same polarity, say positive, then the mask may be shifted so that the normal position of the spot is along line 13 and the operation is as shown in Figure 3. The starting position for the spot is position 23. A positive pulse deflects the spot towards the right and if it is of sufficient magnitude will deflect the pulse beyond the position 24 so that the spot will fall to the upper edge of tooth 17 at position 25 when the pulse is at full value giving a deflection up to the dotted line 12.

When the pulse is removed, the spot will progress leftwards along the upper edge of tooth 17 and when it reaches the end of this tooth, it will fall to the upper edge of tooth 20 and will progress to position 26 as a final position. Thus one positive pulse will move the spot from position 23 to position 26. Successive positive pulses will move the spot in a similar manner to position 27 and position 28 so that it has required three positive pulses to move the spot from the top of the screen at position 23 to the bottom of the screen at position 28.

This would then be a three to one counter for unidirectional pulses. Were the pulses to be negative, it would be only necessary to reverse the connections to the input of the tube so that the same action would result with negative pulses or the mask could be reversed interchanging left side and right side without changing the polarity of the input voltage connection.

For counter service, it is often desirable to establish the counter ratio as an integral part of the cathode ray tube rather than as a part of the mask placed in front of the cathode ray tube. To accomplish this, the mask 4 may be placed inside of the cathode ray tube and electrical connections to it may be made such that the lens 5 and the photoelectric cell 6 become unnecessary.

Figure 4 shows one means whereby this can be accomplished. In this figure the mask 30 is placed within the evacuated envelope of the cathode ray tube and is made of material which is electrically conducting. The beam 31 from the electron gun 32 is caused to reside on any upper edge of this mask by the action of amplifier 33 in the following manner:

When the beam impinges completely upon the target 30, the whole beam current passes through resistor 34 and thus generates a voltage across this resistor which is the input voltage to amplifier 33. This input voltage causes an output voltage to be developed which is applied as before to deflecting plates 8 and also to the output circuit 10. This voltage acting through deflection plates 8 causes the beam to be deflected upwards.

If the beam does not impinge upon the target 30, no current flows through resistor 34 so that no input signal is applied to amplifier 33 in consequence of which a voltage is applied to deflecting plates 8 which causes the beam 31 to be deflected downwards.

The combination of these two actions will cause the beam to graze the target 30, some of it hitting the target and some passing on beyond the target so that just a sufficient current is extracted from that part of the beam which hits the target to cause a voltage across deflecting plates 8 which is of the right magnitude to keep the beam in its position at the top edge of the target.

With a target of this type and the amplifier arrangement as described above, the operation of the counter system will be exactly as descibed before with reference to Figures 2 and 3 since the description of this action was independent of the particular mechanism whereby the beam was held at the top of the mask.

In some applications the counter system may be required to handle voltages of varying magnitudes as pulse voltages. In such circumstances, it is desirable that the region in which the teeth interleave with each other should be short compared to the length of the teeth so that a pulse of small magnitude may cause the spot to go beyond the end of the tooth in question and thus be counted, and yet so that the spot will not be deflected far enough to touch either of the vertical connecting members 35 and 36 because if the spot did this, it would immediately return to the top of the mask and the count would be false.

If pulses of widely differing amplitude are to be counted, means must be provided to prevent the miscounting as described immediately above. This can be accomplished by the device shown in Figure 5 wherein an auxiliary electrode 40 is placed within the cathode ray tube so that it will intercept the beam if it is deflected too far towards the right. When this interception occurs, beam current flows to this auxiliary electrode and flows through resistor 41 thus giving a voltage drop across this resistor.

This voltage is of such a polarity that it causes the deflecting action of the horizontal deflecting plates 42 to be less. This causes the beam to stop on the edge of electrode 40 and prevents it from going into and touching the vertical edge of part 35 of the mask. With this circuit, the input circuit must be modified somewhat.

Figure 5:
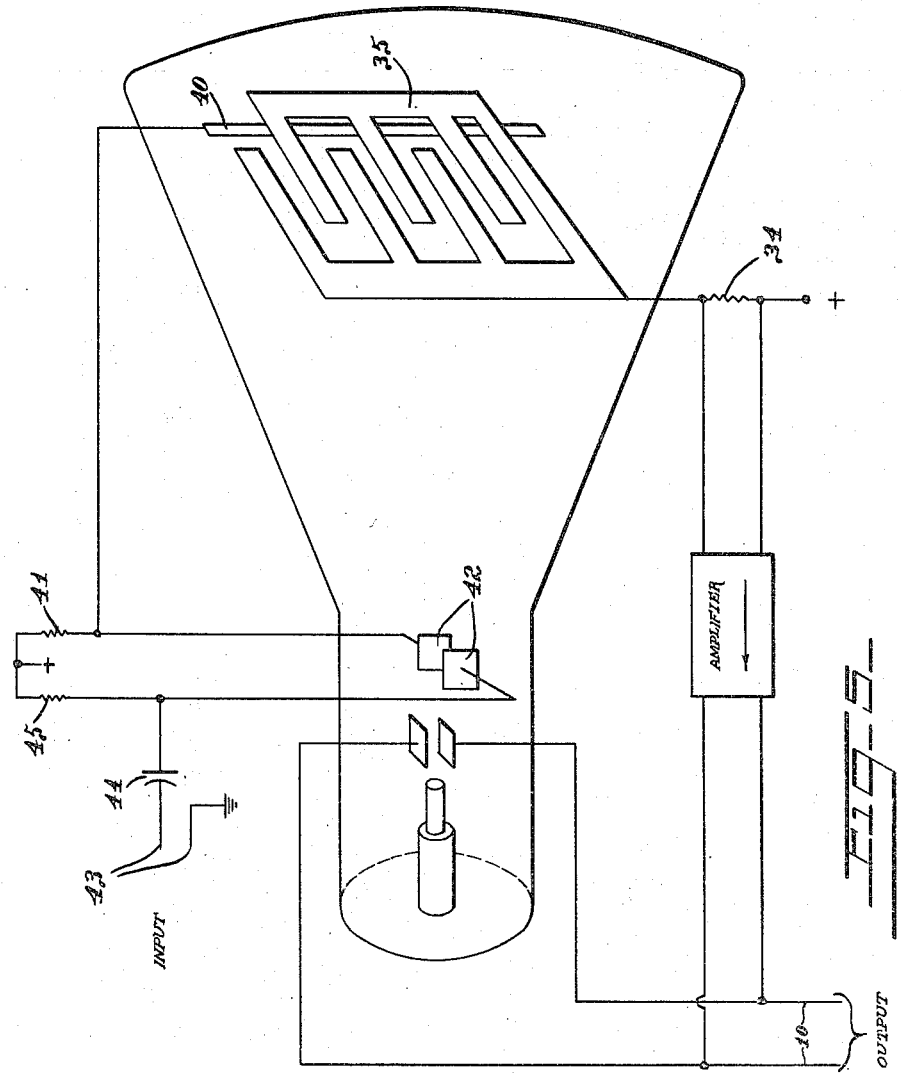
Figure 5 shows a means whereby excessively large pulses can be restrained from giving excessive deflections.

One such modification is shown in Figure 5 wherein the device is shown responsive to negative pulses. These pulses are injected through input leads 43 which with the aid of capacitor 44 presents negative pulses to one of the deflecting plates 42 by reason of the voltage developed across resistor 45. This voltage accomplishes the horizontal sweep pass desired.

The action of the rest of the device shown in this figure is similar to the action as described with respect to Figure 4.

Figure 6:
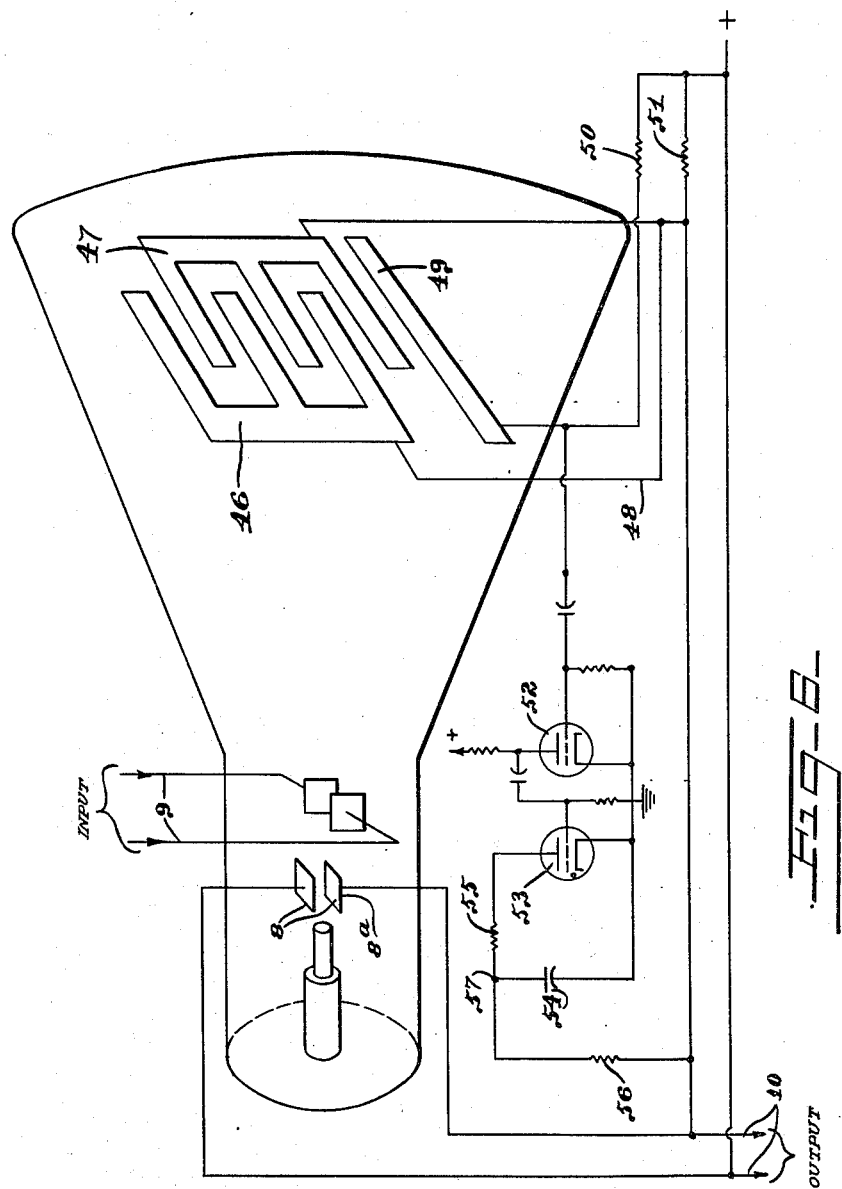
Figure 6 shows a means for returning the beam to the top of the tube.

Once the beam has been moved down to the bottom of the target, it is required to move it back to the top again. This may be accomplished with the aid of an auxiliary electrode 49 as shown in Figure 6. Here tubes 52 and 53 act as a trigger circuit to impress the proper voltage on the deflecting plates 8 to cause the beam to move at least to the top of the target once the beam impinges upon the electrode 49.

When the beam impinges upon electrode 49, current flows through resistor 50, thus suddenly lowering the voltage on the grid of tube 52. The phase reversing action of this tube causes the voltage on the grid of tube 53 to rise sufficiently to cause tube 53, which is a gas tube, to become suddenly conducting. The current through this tube discharges the capacitor 54 and thus lowers the voltage at point 57. Resistors 51 and 56 now act as a voltage divider lowering the voltage on deflection plate 8a and thus causing the cathode ray beam to be deflected upwards. Proper choice of the relative magnitudes of resistors 51 and 56 will cause the beam to be deflected to the top of the tube.

As soon as capacitor 54 is discharged, the voltage remaining on the plate of tube 53 is insufficient to cause conduction, as tube 53 returns to a non-conducting state. After a short interval, capacitor 54 charges through resistors 56 and 51 so that the beam would no longer be held at the top of the tube were it not for the flow of beam current through resistor 51 as the beam just grazes the uppermost edge of the target. Thus the action of the trigger circuit overrides the action of the mask in locating the beam for a short time interval after the beam impinges on electrode 49 causing the beam to return to the top of the target. Then the target regains control over the location of the beam.

In the foregoing description, tubes 52 and 53 have acted as a trigger circuit. There are many trigger circuits known to those skilled in the electronic arts, and it is to be understood that any appropriate trigger circuit may be employed in place of the particular circuit shown.

Another novel feature of the circuit shown in Figure 6 is the absence of an amplifier between the targets 46 and 47, and the deflection plate 8a. Proper proportioning of resistor 51 allows this to be done. Thus the amplifier 33 shown in Figures 1, 4 and 5 is to be considered as optional.

In Figure 7 there is shown an arrangement for obtaining individual outputs from each tooth of the target by separating these teeth from each other electrically with the aid of resistors 81 to 86. Then as the beam progresses downward tooth by tooth, electrical outputs appear on the output lines 61 to 66 in succession.

More specifically, when the beam is resting on the upper edge of target electrode 71, current flows in resistor 81 thus impressing a voltage on output line 61. When an input pulse has moved the beam down to target electrode 72, current flows in resistor 82 thus impressing a voltage on output line 62. Each succeeding movement of the beam to the next target electrode impresses a voltage on the corresponding output line. In this way a series of alternate positive and negative pulses can be distributed sequentially among a series of output circuits.

When the pulses to be so distributed are of only one polarity, it is necessary to use individual circuits for only one half of the target teeth since the beam advances two teeth per pulse as described above with reference to Figure 3. The target arrangement for this use is shown in Figure 8. The action is substantially that of Figure 7 except that for each pulse the beam moves from one tooth of target 46 to one of the teeth 71, 73 or 75 and at the end of the input pulse moves to the next lower tooth on target 46. Consequently the individual output is obtained only while the input pulse is present.

The circuits described in association with Figures 7 and 8 may be used as switching circuits by the introduction of intensity modulation of the beam with a signal to be switched from one circuit to another. This modulating signal then will appear on the output circuit which is connected to the target tooth against which the beam is resting at that instant. As the beam moves from one target tooth to the next, the modulation signal is thus transferred from one output circuit to the next.

If the beam modulation is large, this modulation may disturb the beam locating circuit connected to the deflecting plates 8. This can be avoided by the injection of the modulating signal into the circuit of deflecting plates 8 in a compensating polarity.

If desired, auxilarly electrodes may be arranged to partially intercept the beam in its quiescent positions for the purpose of providing an individual output circuit for each such quiescent position.

It will be appreciated that my invention provides means for accurately counting voltage impulses and creating a voltage proportional to the number of impulses in a manner that is more accurate than previously described methods such as the "stair case" method and which uses only one electron discharge tube as the counting elements. It also provides a high speed, non-mechanical equivalent for the rotary stepper switches used in relay practice having advantages in increased switching speed and decreased maintenance.

Although I have described specific embodiments of my invention, they are but illustrative, and various modifications may be made thereon without departing from the scope of my invention which is described in the following claims.

I claim:

1. In combination, an electron discharge device having means for generating an electron beam, a mask in the projection path of said beam, said mask being in the form of a plurality of projections and having two base sections on opposite sides of the mask area, alternate projections being connected to each of said base sections, a first deflecting means connectible to a source of power for deflecting the beam in a line parallel to said projections and a second deflecting means for deflecting said beam transversely of said projections, a light responsive means in the path of said electron beam and circuit connections from said light responsive means to said second deflecting means, said light responsive means being so positioned with respect to said beam and said mask that when the beam just grazes an edge of said mask the output current from said light responsive means to said first deflecting means locks said beam on the edge.

2. In combination, an electron discharge device having means for generating an electron beam, a mask in the projection path of said beam, said mask being in the form of a plurality of projections and having two base sections on opposite sides of the mask area, alternate projections being connected to each of said base sections, a first deflecting means connectible to a source of power for deflecting the beam in a line parallel to said projections and a second deflecting means for deflecting said beam transversely of said projections, a light responsive means in the path of said electron beam and circuit connections from said light responsive means to said second deflecting means, said light responsive means being so positioned with respect to said beam and said mask that when the beam just grazes an edge of said mask the output current from said light responsive means to said first deflecting means locks said beam on the edge, and an output circuit connected to said second deflecting means and engaged by the same signals in said circuit connections.

3. In combination, an electron discharge device having means for generating an electron beam, a mask in the projection path of said beam, said mask being in the form of a plurality of projections, alternate projections being connected to each other, a first deflecting means connectible to a source of power for deflecting the beam in a line parallel to said projections and a second deflecting means for deflecting said beam transversely of said projections, a light responsive means in the path of said electron beam and circuit connections from said light responsive means to said second deflecting means, said light responsive means being so positioned with respect to said beam and said mask that when the beam just grazes an edge of said mask the output current from said light responsive means to said first deflecting means locks said beam on the edge.

4. In combination, an electron discharge device having means for generating an electron beam, a mask in the projection path of said beam, said mask being in the form of a plurality of projections, alternate projections connected to each other, a first deflecting means connectible to a source of power for deflecting the beam in a line parallel to said projections and a second deflecting means for deflecting said beam transversely of said projections, a light responsive means in the path of said electron beam and circuit connections from said light responsive means to said second deflecting means, said light responsive means being so positioned with respect to said beam and said mask that when the beam just grazes an edge of said mask the output current from said light responsive means to said first deflecting means locks said beam on the edge, and an output circuit connected to said second deflecting means and engaged by the same signals in said circuit connections.

DAVID E. SUNSTEIN.

REFERENCES CITED

The following references are of record in the file of this patent:

UNITED STATES PATENTS

| Number | Name | Date |
|---|---|---|
| 2,075,140 | Schlesinger | Mar. 30, 1937 |
| 2,096,985 | Von Ardenne | Oct. 26, 1937 |
| 2,287,296 | Dallos | June 23, 1942 |
| 2,404,106 | Snyder, Jr. | July 16, 1946 |
| 2,455,532 | Sunstein | Dec. 7, 1948 |
| 2,462,263 | Haynes | Feb. 22, 1949 |
| 2,496,633 | Llewellyn | Feb. 7, 1950 |